(12) United States Patent
Weiss et al.

(10) Patent No.: US 7,988,396 B2
(45) Date of Patent: Aug. 2, 2011

(54) DECK SCREW

(75) Inventors: Tad A. Weiss, Westhampton, MA (US); Richard Belinda, Westfield, MA (US); Joseph A. Pieciak, Jr., West Springfield, MA (US)

(73) Assignee: Handy & Harman, Rye, NY (US)

( * ) Notice: Subject to any disclaimer, the term of this patent is extended or adjusted under 35 U.S.C. 154(b) by 395 days.

(21) Appl. No.: 11/973,906

(22) Filed: Oct. 11, 2007

(65) Prior Publication Data
US 2009/0097942 A1    Apr. 16, 2009

(51) Int. Cl.
F16B 25/02 (2006.01)
F16B 25/10 (2006.01)

(52) U.S. Cl. ......... 411/386; 411/413; 411/416; 411/417

(58) Field of Classification Search ....... 411/386–387.8, 411/413, 416
See application file for complete search history.

(56) References Cited

U.S. PATENT DOCUMENTS

| | | | |
|---|---|---|---|
| RE6,571 E * | 8/1875 | Young | 411/418 |
| 3,083,609 A * | 4/1963 | Lovisek | 411/386 |
| 3,209,383 A * | 10/1965 | Carlson | 470/204 |
| 3,246,556 A * | 4/1966 | Carlson | 411/416 |
| 4,161,132 A * | 7/1979 | Eklund et al. | 411/417 |
| 4,486,135 A * | 12/1984 | Kazino | 411/411 |
| 4,653,244 A * | 3/1987 | Farrell | 52/745.21 |
| 4,673,323 A * | 6/1987 | Russo | 411/107 |
| 4,697,969 A * | 10/1987 | Sparkes | 411/387.7 |
| 5,897,280 A * | 4/1999 | Dicke | 411/411 |
| 6,106,208 A * | 8/2000 | Lin | 411/418 |
| 6,616,391 B1 * | 9/2003 | Druschel | 411/387.2 |
| 6,666,638 B2 | 12/2003 | Craven | |
| 6,789,991 B2 * | 9/2004 | Hsu | 411/387.6 |
| 6,926,484 B2 * | 8/2005 | Kram et al. | 411/311 |
| 6,941,635 B2 | 9/2005 | Craven | |
| 7,189,045 B2 | 3/2007 | McGovern et al. | |
| 7,293,947 B2 | 11/2007 | Craven | |
| 7,367,768 B2 | 5/2008 | McGovern et al. | |
| 2002/0127084 A1 * | 9/2002 | Hsu | 411/387.4 |
| 2004/0141827 A1 * | 7/2004 | Dicke | 411/413 |
| 2004/0228705 A1 | 11/2004 | Baer et al. | |
| 2007/0128001 A1 * | 6/2007 | Su | 411/413 |
| 2007/0217887 A1 * | 9/2007 | Lin | 411/413 |
| 2007/0286701 A1 * | 12/2007 | Hsu | 411/387.1 |
| 2008/0031705 A1 * | 2/2008 | Severns | 411/413 |
| 2009/0110512 A1 * | 4/2009 | Chen | 411/386 |

FOREIGN PATENT DOCUMENTS
EP    1 207 312 A2    5/2002
* cited by examiner

Primary Examiner — Flemming Saether
(74) Attorney, Agent, or Firm — Alix, Yale & Ristas, LLP

(57) ABSTRACT

A fastener for composite material having a dense composition employs a head which has a socket and a recessed underside and a lower rim. The shank has an upper portion with an enlarged diameter and a left hand thread while the lower portion has a tri-lobed configuration and is traversed by a right hand thread. The right hand thread may have a plurality of notches which, in one embodiment, are arranged in a spiral array.

20 Claims, 13 Drawing Sheets

DECK SCREW

BACKGROUND OF THE TECHNOLOGY

This technology relates to fasteners which are employed for fastening composite material to a support structure. More particularly, the fasteners relate to deck screws employed for securing dense composite material.

Numerous fasteners have been advanced for fastening deck members which are composed of composite material. Several of these such deck fasteners are directed to eliminating the volcanoing or mushrooming effect. As the technology of composite materials has advanced, the denseness of the composite members has increased. The increased denseness has had a significant impact on the effectiveness of conventional deck screws. Accordingly, many deck screws which were adapted to perform in earlier composite environments are significantly less effective in the more dense material. A significant issue resides in the difficulties of driving fasteners into very dense composite materials.

SUMMARY OF THE DISCLOSURE

In one embodiment, a fastener for composite lumber comprises a head having a socket rotatably couplable for application of a torque and having a recessed underside with a lower rim. An elongated shank extends from the head and terminates at a distal tip. The shank has an upper portion with an enlarged diameter and a lower portion with a reduced diameter. The upper portion is traversed by a left hand thread. The lower portion has a tri-lobed configuration and is traversed by a right hand thread with the right hand thread having a plurality of notches.

The right hand thread may extend substantially to the tip. At least one notch may be formed in the tip thread. In one embodiment, at least two notches are formed in the tip thread with at least two notches being out of phase. The notches form a spiral array. A land extends between the threads. The socket is preferably a square socket. The number of threads per inch of the left hand thread is less than the number of threads per inch of the right hand thread. The thread angle of the left hand thread is greater than the thread angle of the right hand thread. The left hand thread preferably has a minor diameter greater than the minor diameter of said right hand thread.

DETAILED DESCRIPTION

Figure 6:
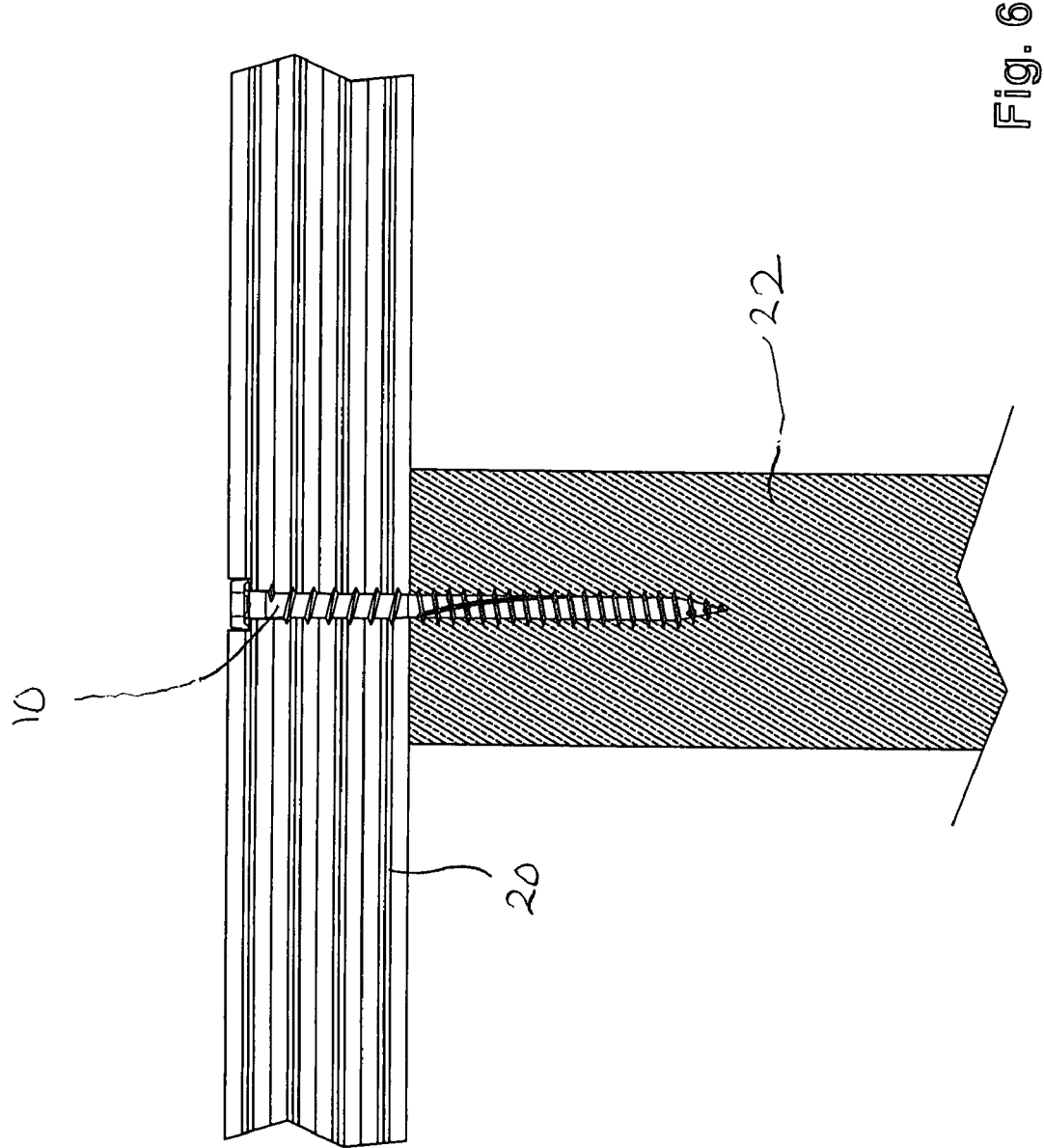
FIG. 6 is a sectional view illustrating the deck screw of FIG. 1 as employed for securing a composite material to a support structure.

With reference to the drawings wherein like numerals represent like parts throughout the several views, a deck screw is generally designated by the numeral 10. Deck screw 10 is especially adapted for securing elongated deck members 20 to a support member 22 wherein the composite material is a highly dense material such as, for example, Trex™ deck material, Timber Tech™ deck planks, etc. As illustrated in FIG. 6, the deck screw 10 functions to be driven through the composite member 20 into the support structure 22 to a depth wherein the head is below the upper surface of the material and forms a cylindrical counterbore above the head. The deck screw 10 can be driven without volcanoing or mushrooming of the material around the head and can be relatively easily driven without intense resistance to the application of torque during the driving process.

Figure 1:
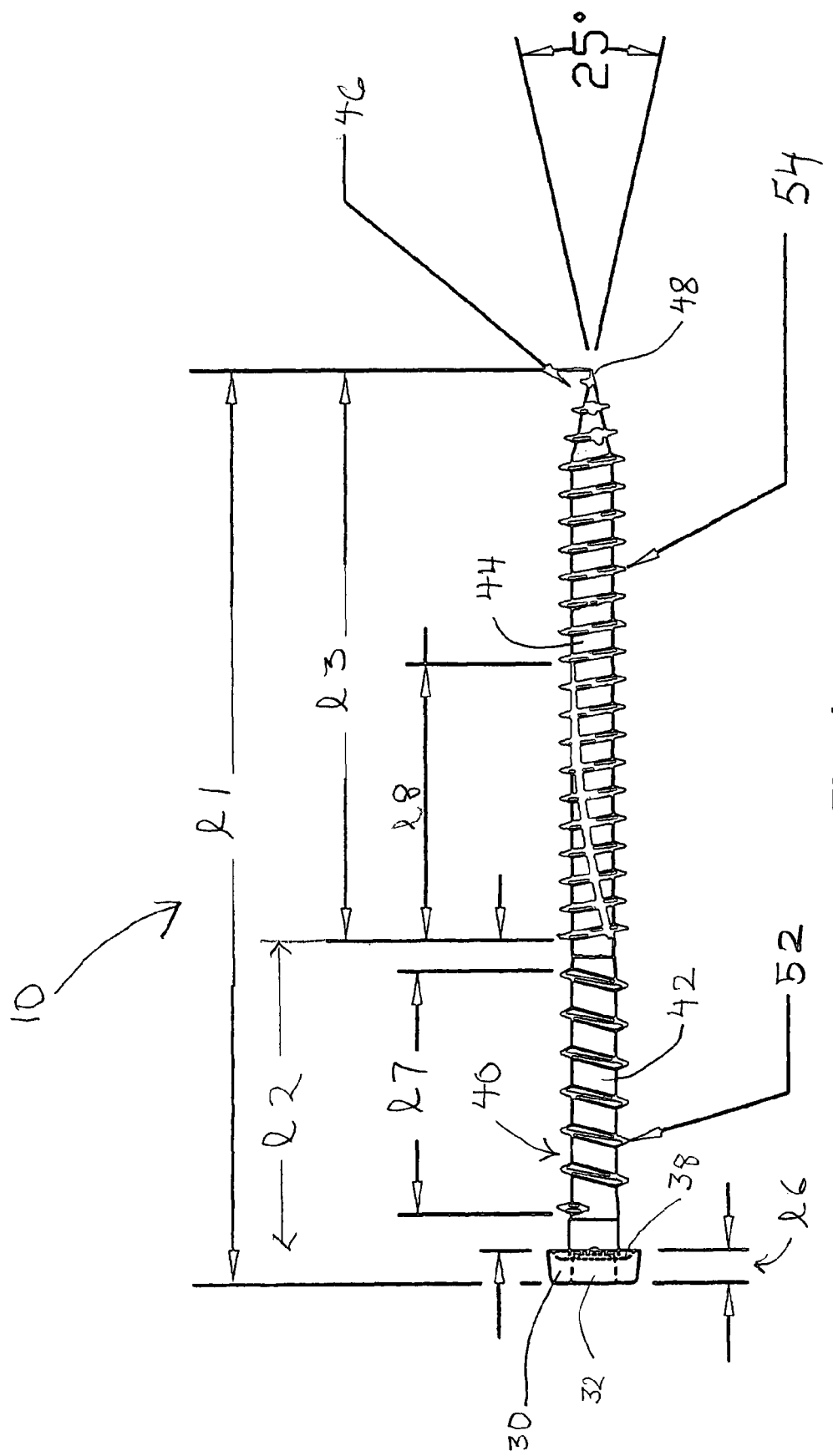
FIG. 1 is a longitudinal view, partly in phantom and partly in diagrammatic form, of a deck screw.

With reference to FIG. 1 the deck screw 10 includes a head 30 and an elongated shank 40 which extends from the head and has a generally bifurcated form. In one embodiment, the screw length l1 is 2.75 ins with a head diameter d1 of 0.285 ins. The shank 40 has an upper portion 42 of length l2 of enlarged nominal diameter and a lower portion 44 of length l3 of reduced nominal diameter which has a distal tip 46. The tip terminates in a well-defined vertex point 48 which in the preferred form has a vertex angle of 25 degrees. The tip 46 functions as a drill point.

Figure 2:
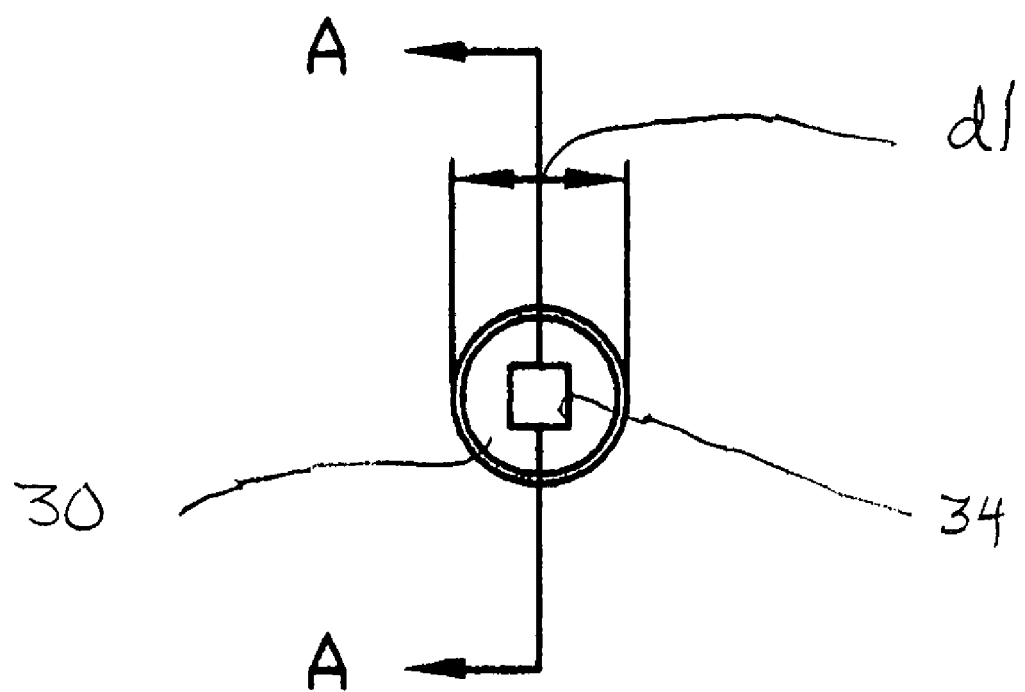
FIG. 2 is an end view of a head portion of the deck screw of FIG. 1.
Figure 3:
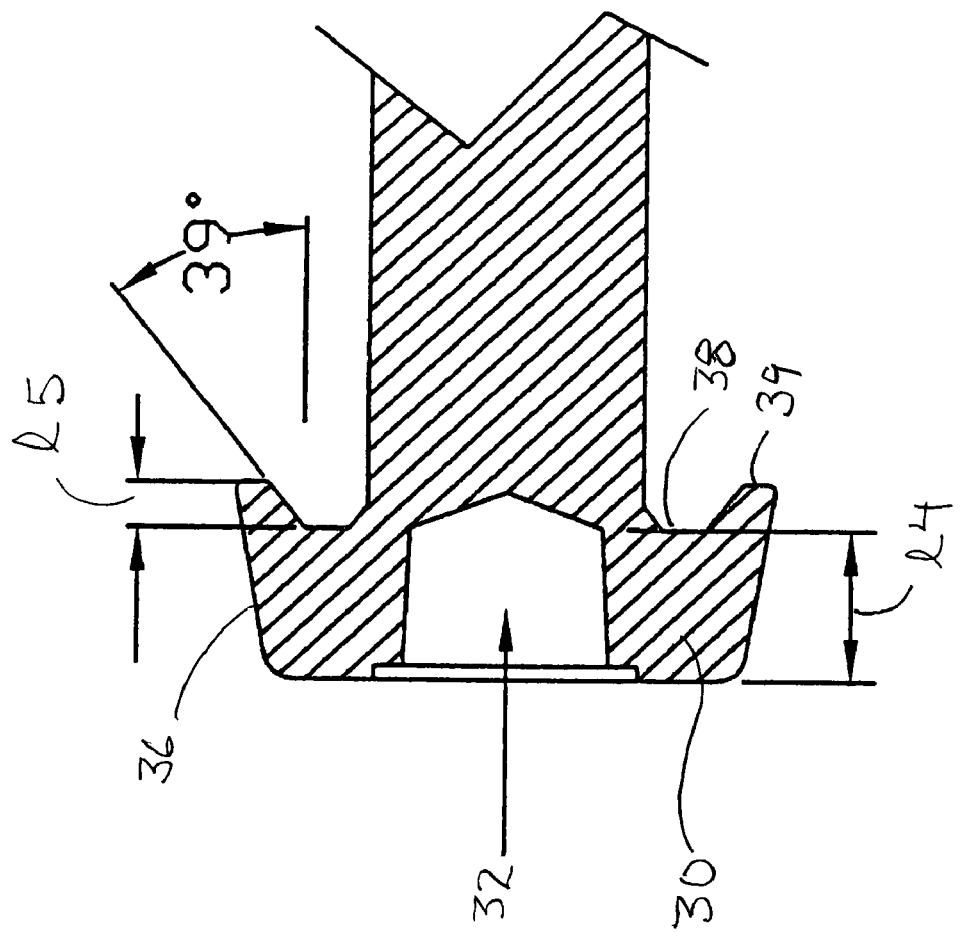
FIG. 3 is an enlarged sectional view, partly in diagrammatic form, of a head and end portion of the deck screw of FIG. 1 taken along the lines of A-A of FIG. 2.

With additional reference to FIGS. 2 and 3, the head 30 includes a recess 32 which at an upper portion is defined by a #1 square socket 34 and is adapted for coupling with a torque driver bit (not illustrated). Socket 34 preferably has a minimum depth of 0.075 ins and preferably a depth from 0.075 ins to 0.095 ins. If the socket depth is too shallow, the head will disengage during driving. If the head is too deep, the structural integrity of the head is jeopardized. The corners of the socket 34 may be rounded (not illustrated).

Figure 2A:
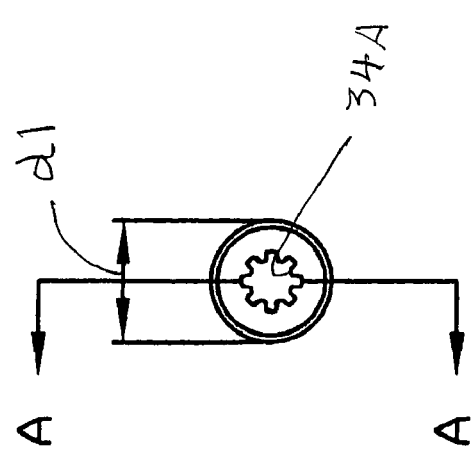
FIG. 2A is an end view of an alternative embodiment of a head portion of the deck screw of FIG. 1.

With reference to FIG. 2A, an alternative socket 34A is defined by 8 radial slots and is adapted for coupling with a torque driver (not illustrated). The coupling socket 34A may be similar in form and function to that described co-pending U.S. patent application Ser. No. 11/185,377 filed Jul. 20, 2005 which is assigned to the applicant of the present invention and the disclosure of which is incorporated by reference. The eight point torque driving engagement provides an efficient coupling engagement to facilitate torqueing of the deck screw and mitigate against disengagement of the tool during the driving process.

The head 30 includes a tapered skirt-like periphery 36 which includes a recessed underside 38 and a lower cutting rim 39. In one form, the angle of the underside flaring is on the order of 39 degrees as illustrated in FIG. 3. The head socket 34 is adapted to efficiently couple with the driver. The underside 38 of the head is configured to prevent composite material from being displaced past the head during the driving process and for capturing the composite material and trapping same at its underside. The cutting rim 39 is adapted to provide a clean, circular opening in the composite material and to present a pleased, finished setting of the deck screw in the drive bore so that the top surface of the head is below the surface of the dense composite material (FIG. 6).

Figure 4:
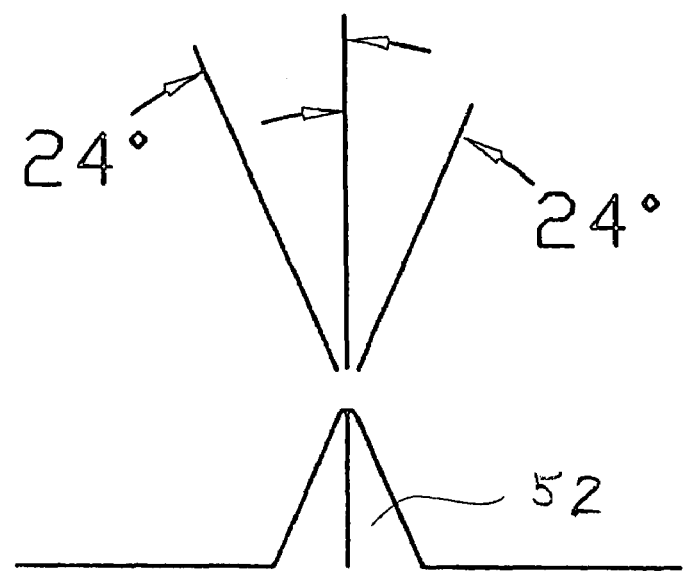
FIG. 4 is a diagrammatic view illustrating a representative thread profile for a top portion of the deck screw of FIG. 1.

The shank 40 has an upper portion 42 proximate the head which has a larger diameter than that of the lower portion 44. In one embodiment, the upper portion 42 includes a left hand thread 52 which extends a length l7 or approximately 0.750 inches and is 9 threads per inch. Thread 52 has a thread angle of 48 degrees as illustrated in FIG. 4. In a preferred embodiment of thread 52, the minor thread diameter is 0.133 inches and the major thread diameter is 0.210 inches.

Various approximate dimensions for one embodiment are summarized in Table I.

TABLE I

| | |
|---|---|
| d1 | 0.285 ins |
| l1 | 2.75 ins |
| l2 | 0.80 ins |
| l3 | 1.75 ins |
| l4 | 0.02 ins |
| l5 | 0.10 ins |
| l6 | 0.12 ins |
| l7 | 0.75 ins |

In another embodiment l7 is approximately 0.45 ins. and l3 is approximately 1.675 ins.

Figure 5:
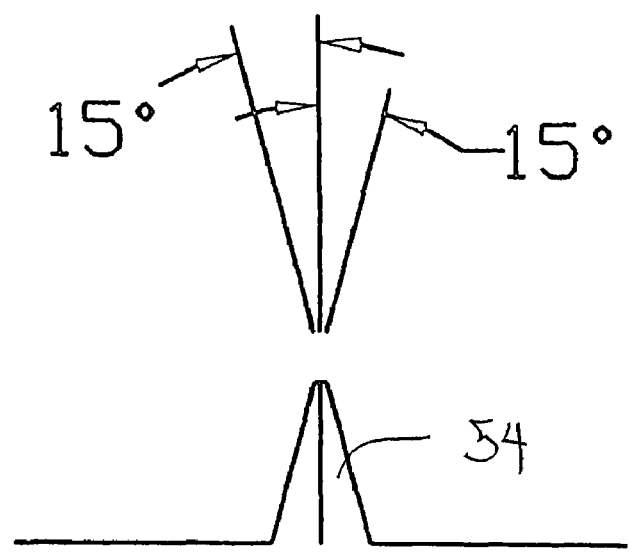
FIG. 5 is a diagrammatic view illustrating a representative thread profile for a bottom portion of the deck screw of FIG. 1.
Figure 15:
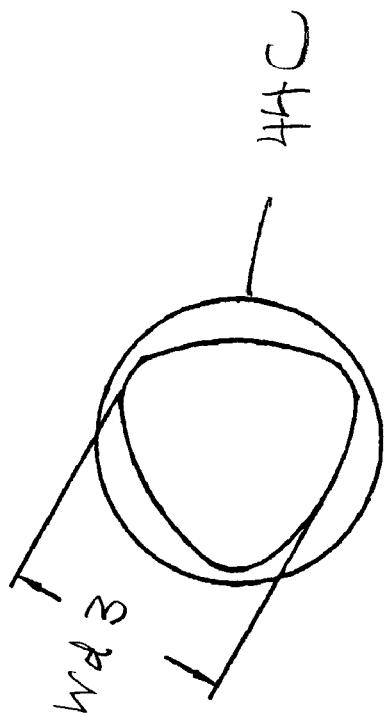
FIG. 15 is an enlarged sectional view, partly in phantom and partly in diagrammatic form, taken along the lines D-D of FIG. 14.
Figure 13:
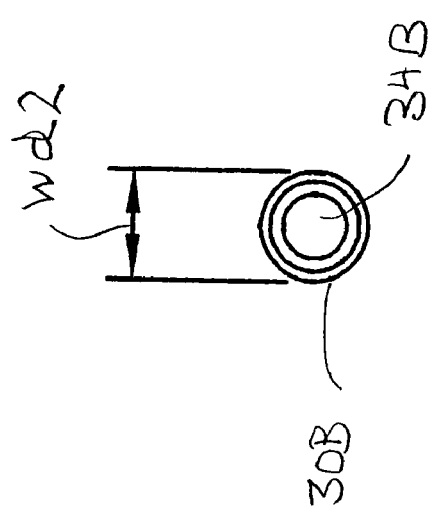
FIG. 13 is an end view of the workpiece of FIG. 12.

As will be further described, the lower shank portion 44 also has a tri-lobe configuration as best illustrated in FIG. 15. The lower shank portion 44 is traversed by a right hand thread 54 which is 12 threads per inch and has an included thread angle of 30 degrees as illustrated by the profile of FIG. 5. A preferred embodiment of thread 54 has a minor diameter md of 0.123 inches and a major diameter Md of 0.190 to 0.196 inches.

Figure 7:
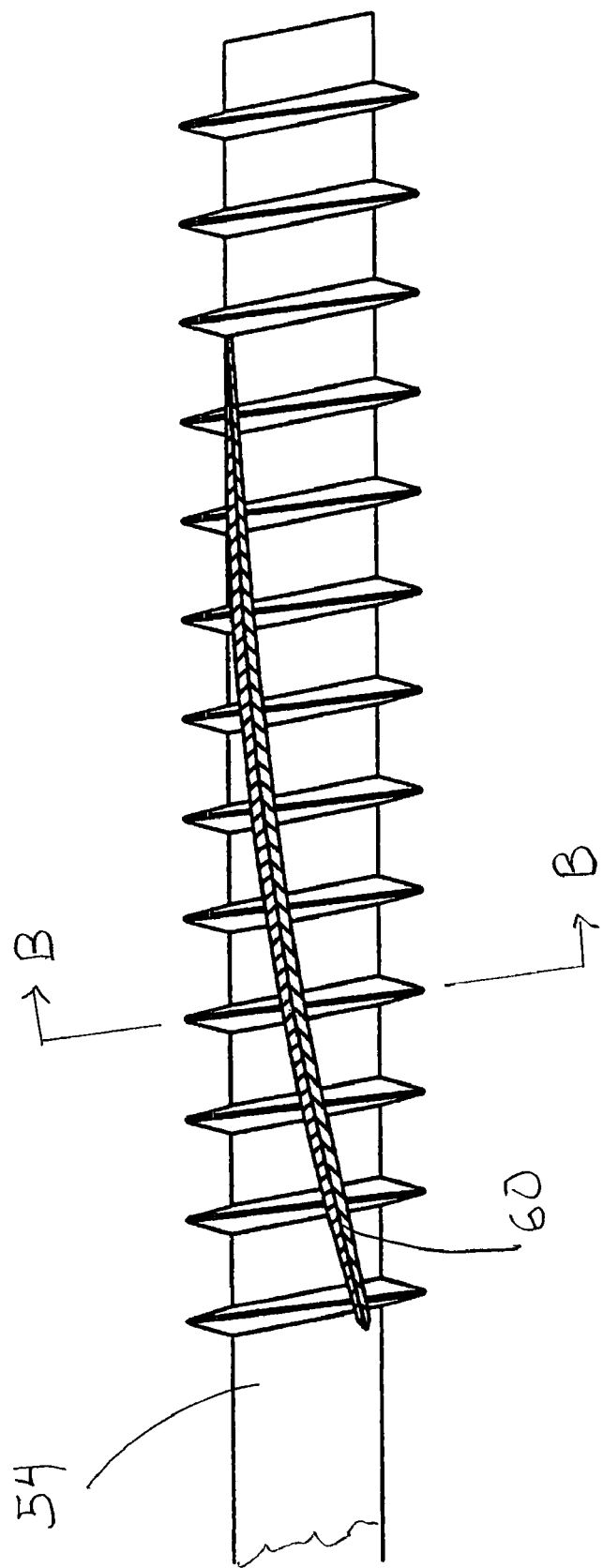
FIG. 7 is an enlarged longitudinal view of a medial portion of the deck screw of FIG. 1.
Figure 8:
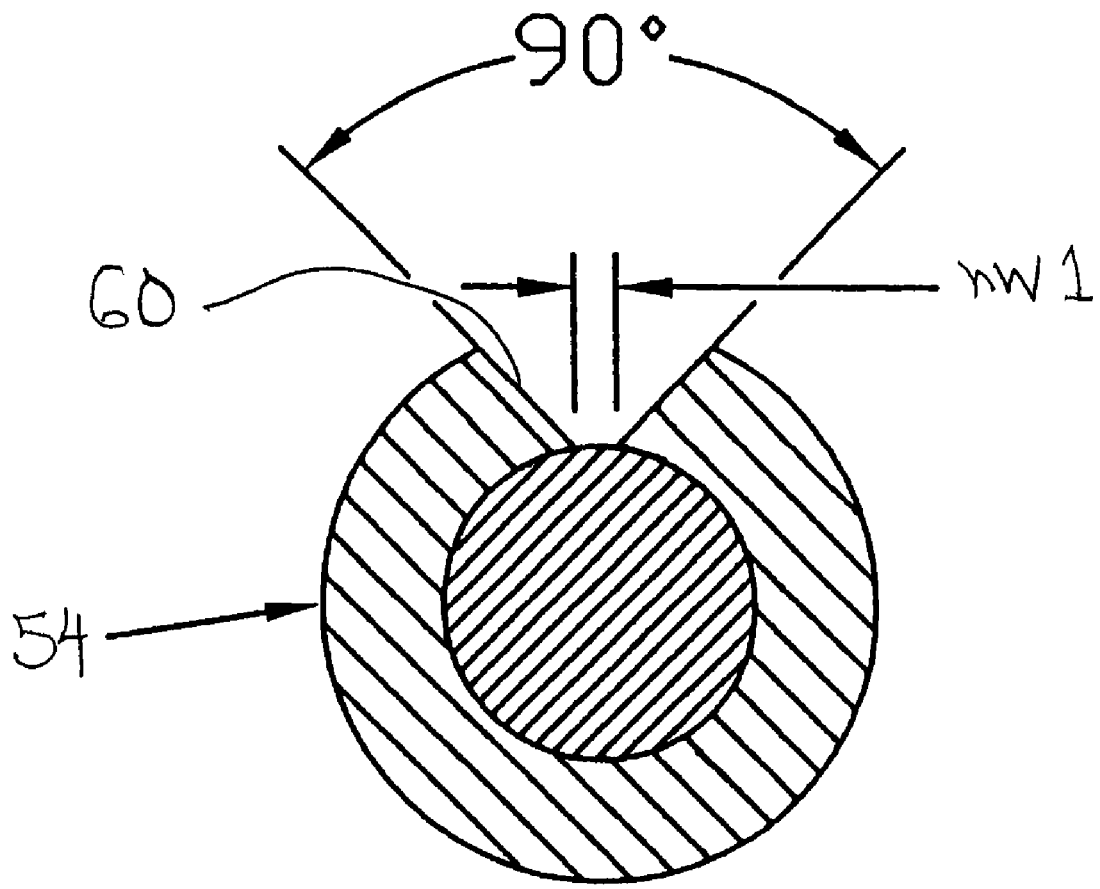
FIG. 8 is an enlarged cross-sectional view, partly in diagrammatic form, taken along the lines of B-B of FIG. 7 and rotated 90°.

With reference to FIGS. 1 and 7, the thread 54 for a length l8 of approximately 0.5 to 0.9 inches is traversed by a spiral array of notches 60. As best illustrated in FIG. 8, the spiral array 60 subtends an angle of approximately 90 degrees about the shank axis with the depth of each notch being approximately the minor diameter. The notch width nw1 is approximately 0.10 inches. The spiral array 60 extends approximately 1 revolution per 1.5 inches in length.

The spiral array 60 as illustrated in FIGS. 1, 6 and 7 has been schematically illustrated to describe the spiral relationship. In this regard, it should be noted that the spiral lines formed on the shaft are typically not visible in the actual fastener since the notches are confined within the thread, and do not impinge into the minor diameter and terminate at approximately the minor diameter.

Figure 9:
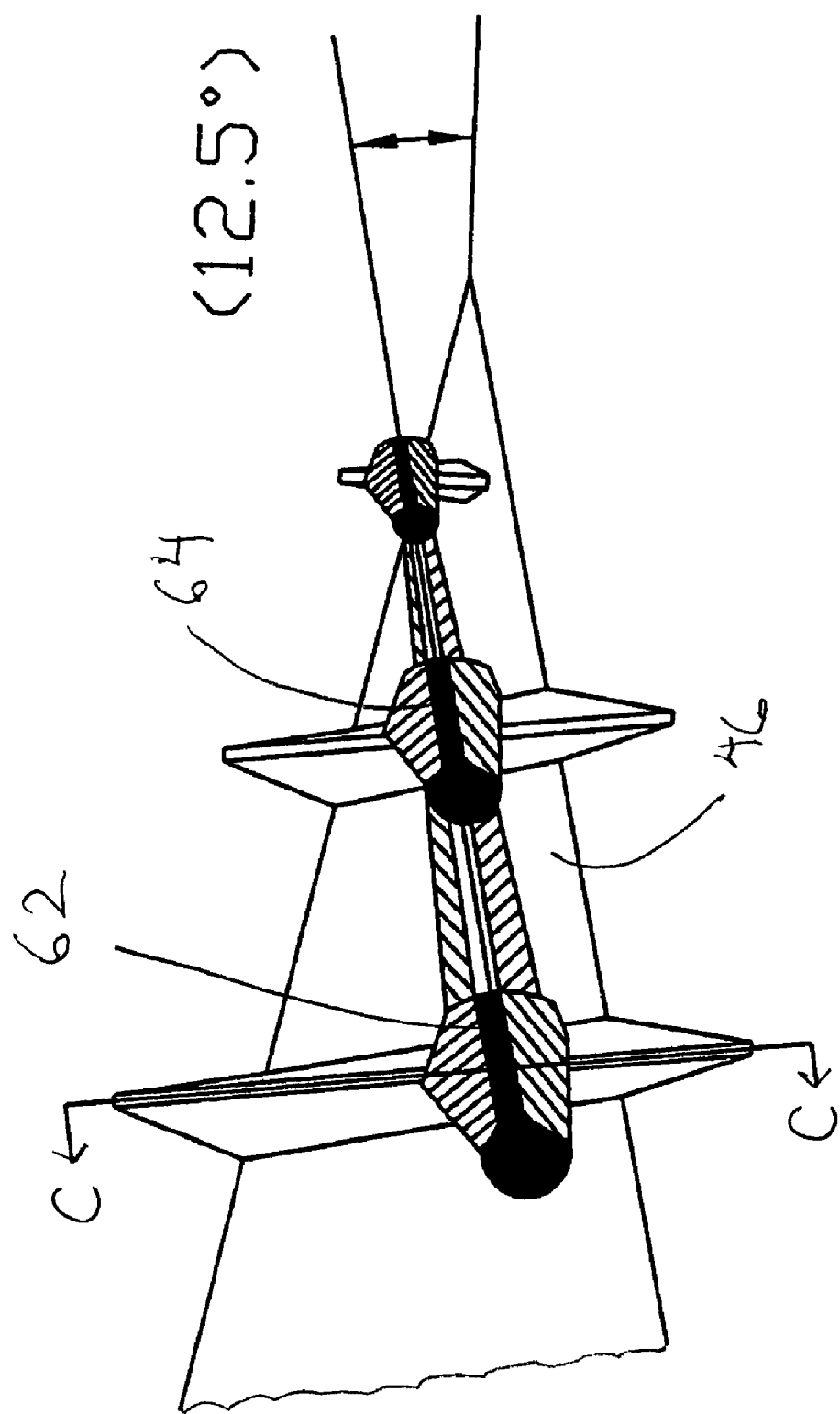
FIG. 9 is an enlarged fragmentary view, partly in diagrammatic form, of a tip portion of the deck screw of FIG. 1.
Figure 9A:
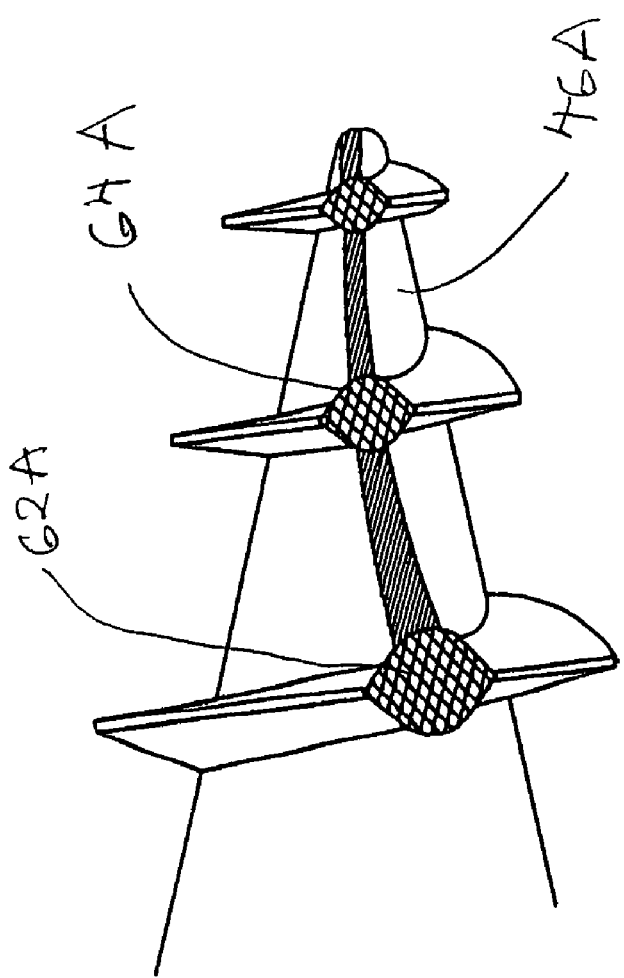
FIG. 9A is an enlarged fragmentary view, partly in diagrammatic form, of an alternative tip portion of the deck screw of FIG. 1.
Figure 10:
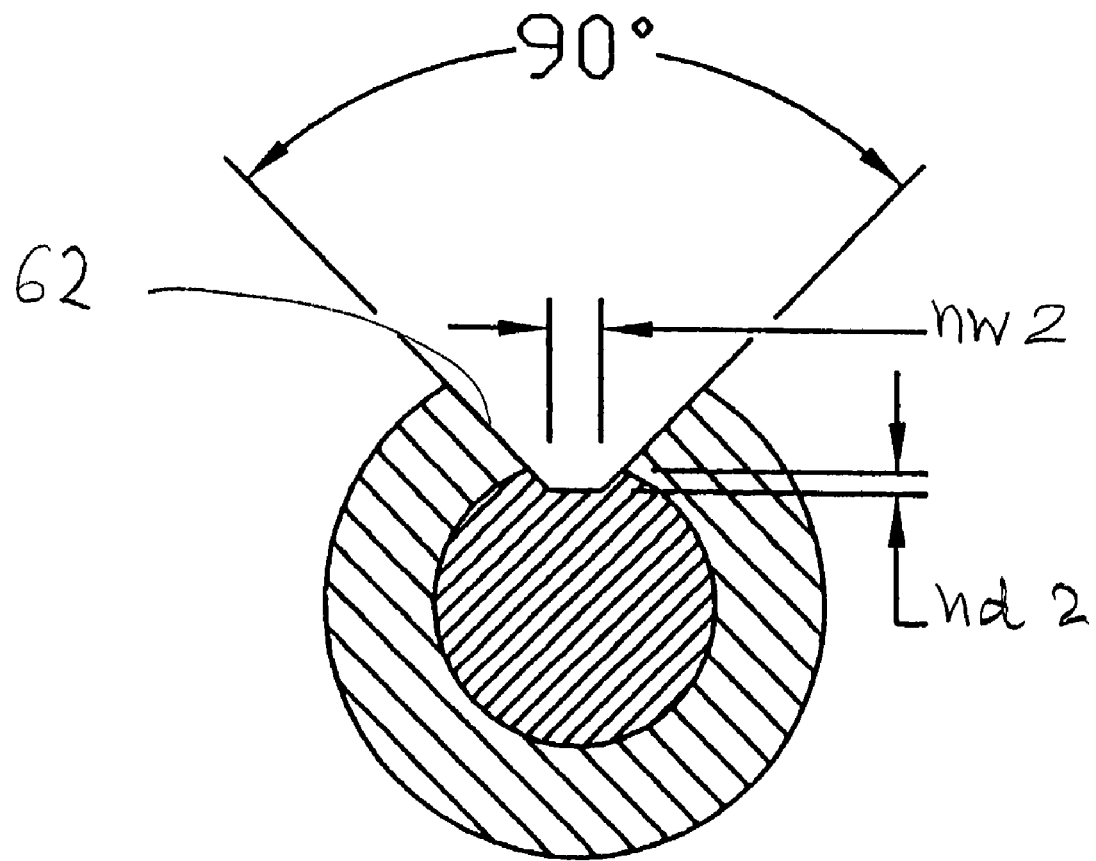
FIG. 10 is a sectional view, partly in diagrammatic form, taken along the lines of C-C of FIG. 9.
Figure 11:
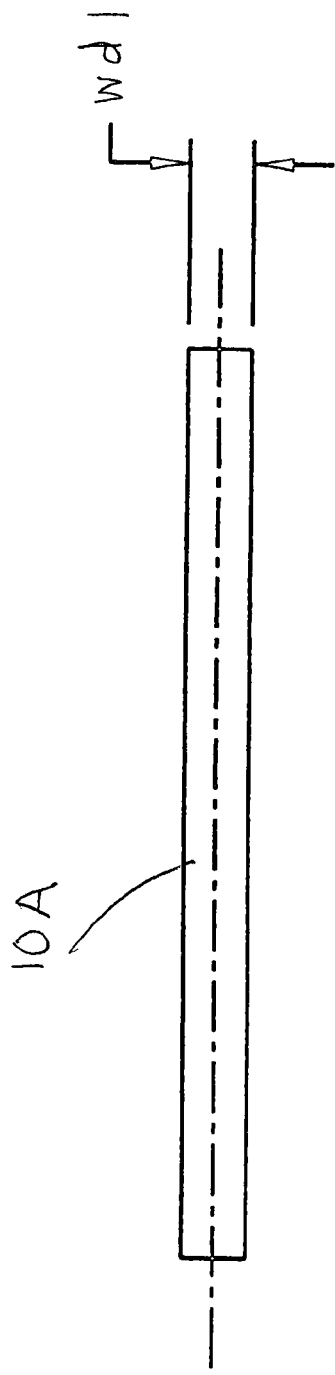
FIG. 11 is a longitudinal side view, partly in diagrammatic form, illustrating a first stage workpiece stage for the deck screw of FIG. 1.
Figure 12:
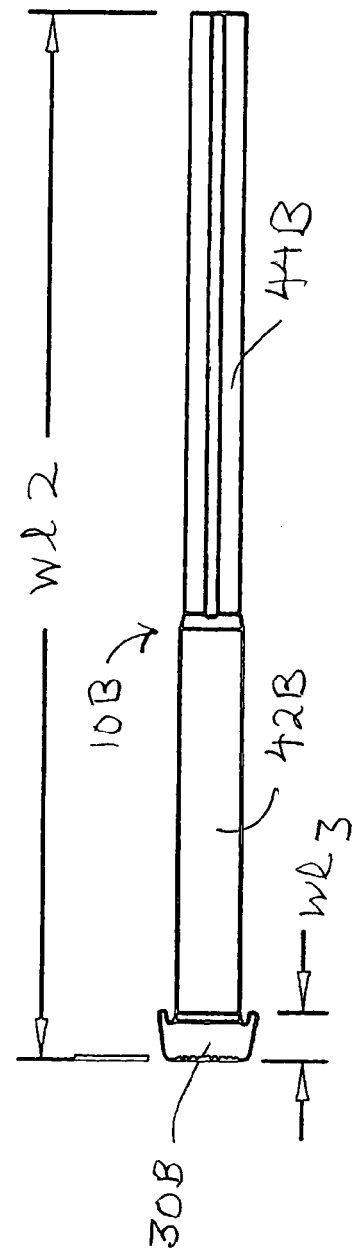
FIG. 12 is a longitudinal sectional view, partly in diagrammatic form, of a second stage workpiece for the deck screw of FIG. 1.

With reference to FIG. 9, the shank terminates in the tip 46 which continues the spiral thread 54. A notch 62 is shown in section the width nw2 may be longer for notch 62. In some embodiments, only one notch may be employed for the tip. If two notches are employed, the second notch 64 is slightly out of phase to create a split point. The notches 62, 64 may extend to a depth slightly into the minor diameter at the tip as illustrated in FIG. 10. The depth wd2 of the notch is 0.12 inches. Another tip 46A having a blunt point with notches 62A and 64A is illustrated in FIG. 9A.

Representative dimensions for lower portion 44 for a preferred embodiment are set forth in Table II.

TABLE II

| | |
|---|---|
| l8 | 0.5 to 0.9 ins |
| nw1 | 0.10 ins |
| nd2 | 0.12 ins |
| md | 0.123 ins |
| Md | 0.190 to 0.196 ins |

The manufacturing process for the deck screw 10 is best illustrated in the FIGS. 11-15. The initial work piece cut off shown as 10A in FIG. 11 has a workpiece diameter wd1 of 0.15 ins and a workpiece length wl1 of 2.70 ins. The first blow shown in FIG. 12 produces workpiece 10B which forms the bifurcated shank portions 42S, 44B and the head 30B with workpiece lengths wl2 of 2.68 ins and wl3 of 0.125 ins and workpiece head diameter wd2 of 0.250 ins. The coupling recess 32 is then punched into the head portion to form the final head detail as shown in FIG. 3.

Figure 14:
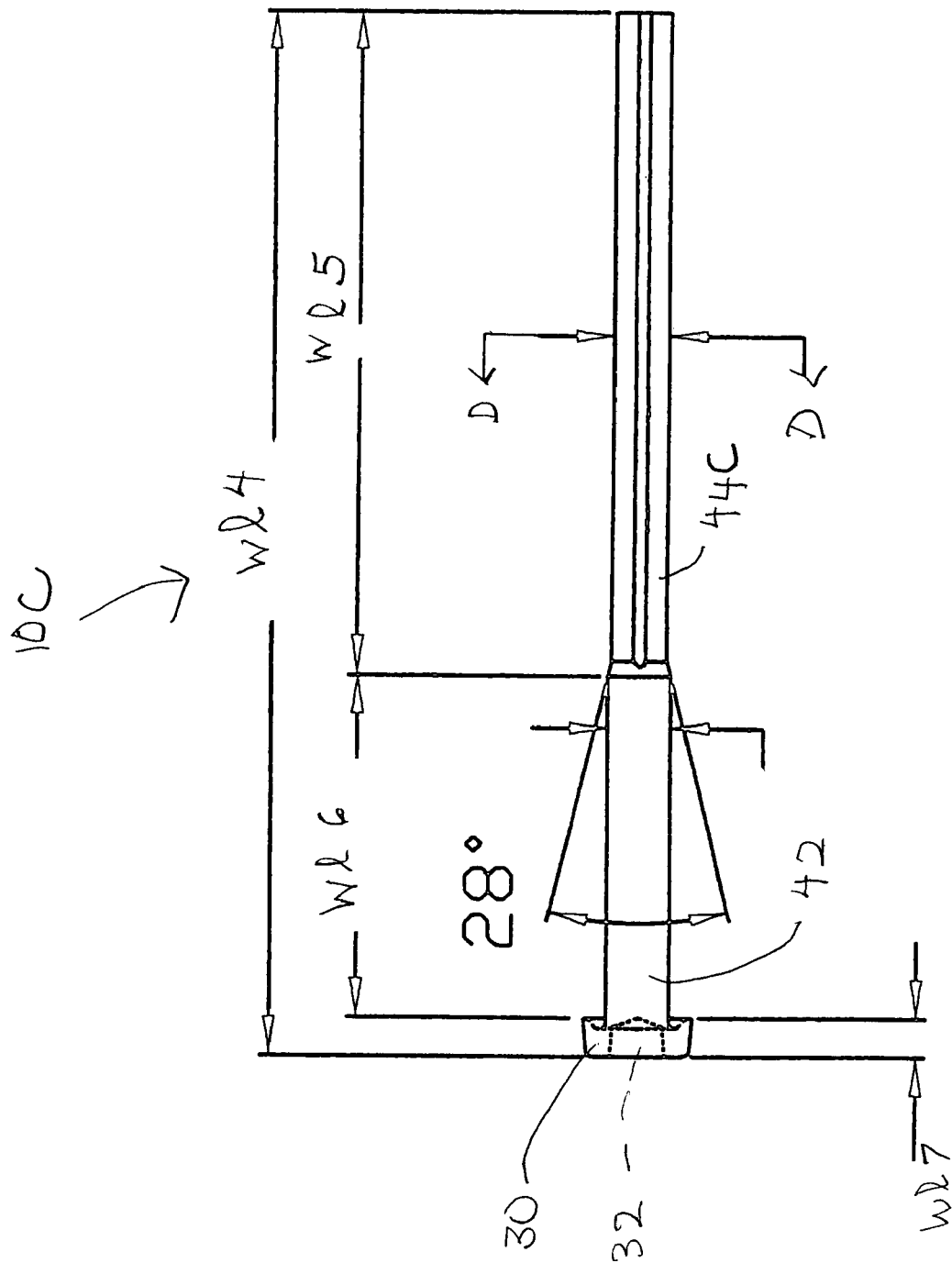
FIG. 14 is a longitudinal view, partly in diagrammatic form, and partly in phantom, of a third stage workpiece for the deck screw of FIG. 1.

FIG. 14 shows the tri-lobe formed shank portion 44A for the workpiece 10C. The dimensions for workpieces 10A, 10B and 10C are given in Table III for a screw 10 having a final length l1 of 2.75 ins.

TABLE III

| | |
|---|---|
| l1 | 2.75 ins |
| Wd3 | 0.137 ins |
| wl1 | 2.70 ins |
| wd1 | 0.15 ins |
| wl2 | 2.68 ins |
| wd2 | 0.250 ins |
| wl3 | 0.125 ins |
| wl4 | 2.69 ins |
| wl5 | 1.715 ins |
| wl6 | 0.875 ins |
| wl7 | 0.115 ins |

The threads 52, 54 are then rolled onto the workpiece 10C. The notches 60 and 62 are then punched into the workpiece. Alternately, the notches may be formed during the thread forming process.

What is claimed:

1. A fastener for composite lumber comprising:
a head having a socket rotatably couplable for application of a torque and having a recessed underside and a lower rim;
an elongated shank extending from said head and terminating at a distal tip and comprising an upper portion having an enlarged diameter and a lower portion having a reduced diameter and a tapered tip portion;
said upper portion having a generally cylindrical configuration traversed by a left-hand thread having a major diameter; and
said lower portion having a tri-lobed configuration traversed by a right-hand thread, said right-hand thread having a major diameter less than the major diameter of said left-hand thread and defining a minor diameter having a plurality of notches which do not extend into the minor diameter.

2. The fastener of claim 1 wherein said right-hand thread extends substantially to said tip.

3. The fastener of claim 2 comprising at least one notch in said right-hand thread of said tip portion.

4. The fastener of claim 3 wherein there are at least two notches in said tip portion, two of said notches being out of phase.

5. The fastener of claim 1 wherein said notches form a spiral array.

6. The fastener of claim 1 wherein a land extends between said threads.

7. The fastener of claim 1 wherein said socket has 8 points.

8. The fastener of claim 1 wherein the number of threads per inch of the left-hand thread is less than the number of threads per inch of the right-hand thread.

9. The fastener of claim 1 wherein the thread angle of the left-hand thread is greater than the thread angle of the right-hand thread.

10. A fastener for composite lumber comprising:
a head rotatably couplable for application of a torque and having a recessed underside and a lower cutting rim;
an elongated shank extending from said head and terminating at a distal tip and comprising an upper portion, a lower portion, and a tapered tip portion;
said upper portion having a generally cylindrical configuration and being traversed by a left-hand thread having a major diameter; and
said lower portion having a tri-lobed configuration and being traversed by a right-hand thread having a major diameter less than the major diameter of the left-hand thread which continues along said tapered tip portion, said right-hand thread defining a minor diameter in said lower portion and having a spiral array of notches which substantially terminate at said minor diameter.

11. The fastener of claim 10 wherein said right-hand thread extends substantially to said tip.

12. The fastener of claim 11 comprising at least one notch in said thread of said tapered tip portion.

13. The fastener of claim 12 wherein there are two notches in said tip thread, said two notches being angularly offset relative to a central longitudinal axis of said fastener.

14. The fastener of claim 10 wherein said left-hand thread has a minor diameter greater than that of said right-hand thread.

15. A fastener for composite lumber comprising:
a head having a socket rotatably couplable for application of a torque;
an elongated shank extending from said head and terminating at a distal tip and comprising a first portion having an enlarged diameter, a second portion having a reduced diameter and a tapered distal tip portion;
said first portion having a generally cylindrical configuration traversed by a first thread having a major diameter; and
said second portion having a tri-lobed configuration traversed by a second thread having a major diameter less than the said major diameter of said first thread and defining a minor diameter having a thread hand opposite that of the first thread, said second thread having a plurality of notches which are angularly offset to form a spiral array radially inwardly terminating at said minor diameter, and said tip portion has a tip threading defining a tapered tip minor diameter with at least one notch which radially extends into said tip minor diameter.

16. The fastener of claim 15 wherein said second thread extends substantially to said tip.

17. The fastener of claim 16 comprising a plurality of offset notches in said tip thread.

18. A fastener for composite lumber comprising:
a head having a square socket rotatably couplable for application of a torque;
an elongated shank extending from said head and terminating at a distal tip and comprising an upper portion and a lower portion;
said upper portion having a generally cylindrical configuration traversed by a first thread having a major diameter; and
said lower portion having a tri-lobed configuration traversed by a second thread having a thread hand opposite that of the first thread and having a major diameter less than the said major diameter of said first thread, said second thread defining a minor diameter and having a plurality of notches which inwardly terminate without impinging said minor diameter, and said second thread continues to a tip portion which tapers adjacent said tip and defines a plurality of notches which radially inwardly extend into the tapered tip portion.

19. The fastener of claim 18 wherein said second thread extends substantially to said tip.

20. The fastener of claim 19 comprising a plurality of offset notches in said second thread at said tip portion.

* * * * *